July 21, 1931. E. K. BAKER 1,815,821
WHEEL MOUNTING MEANS
Filed May 5, 1927
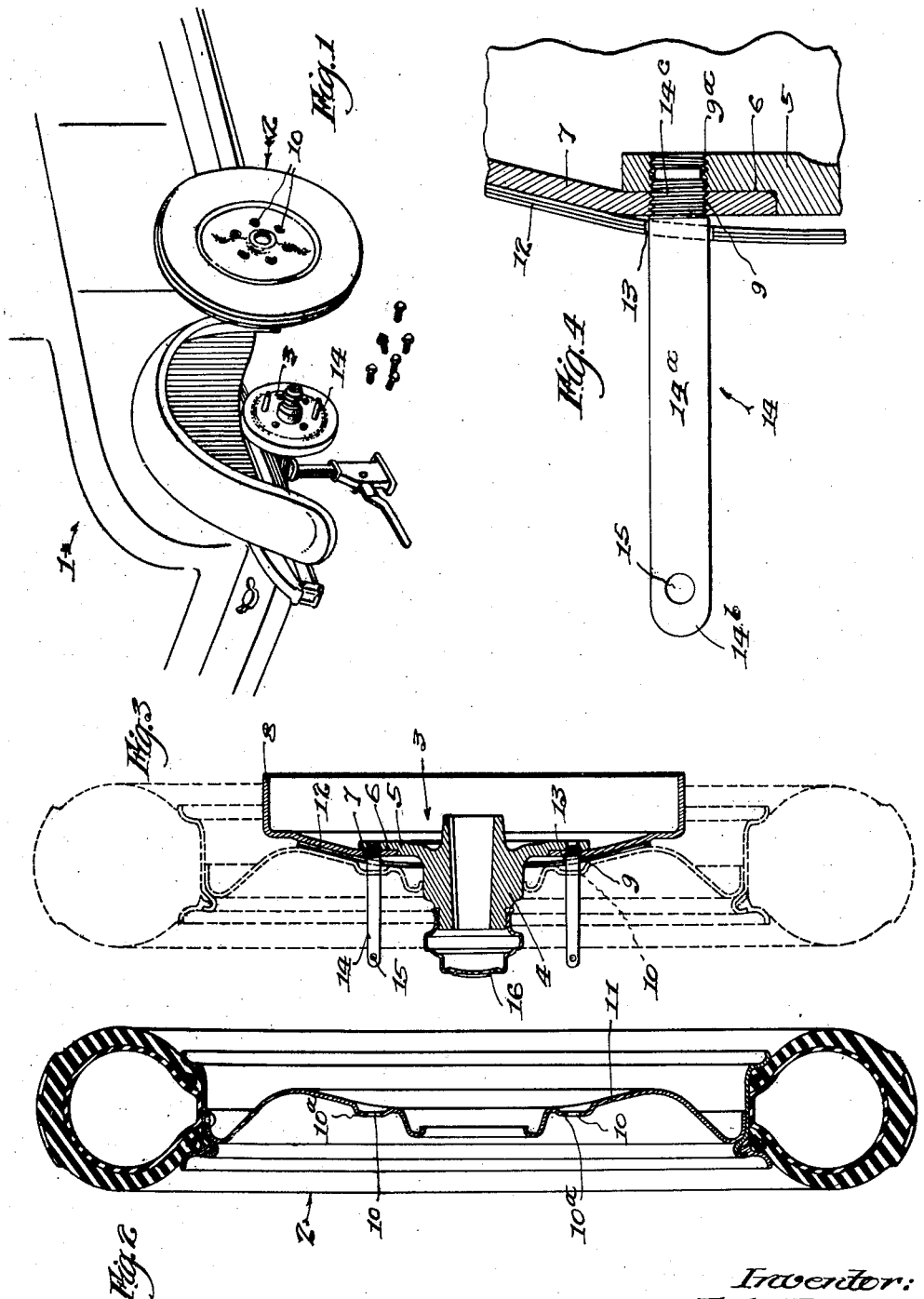
Inventor:
Eric K. Baker Patented July 21, 1931

1,815,821

UNITED STATES PATENT OFFICE

ERLE K. BAKER, OF CHICAGO, ILLINOIS, ASSIGNOR TO MOTOR WHEEL CORPORATION, OF LANSING, MICHIGAN, A CORPORATION OF MICHIGAN

WHEEL MOUNTING MEANS

Application filed May 5, 1927. Serial No. 188,922.

This invention relates to improvements in wheel mounting means and it consists of the matters hereinafter described and more particularly pointed out in the appended claims.

Many automobiles have demountable wheel equipment. In some cases the usual attaching bolts are secured in the hub flange to project through the wheel to receive associated cap nuts and in other cases cap screws or bolts are removable from the back flange of the hub. In both instances difficulty is met with and a great effort is expended in making a wheel change because with the first case, it is almost impossible to line up the wheel holes with the bolts as they are obscured by the wheel and are indeed short and in the second case, there is no means by which the wheel holes may be lined up with the hub flange holes.

My invention relates more particularly to means for mounting wheels of the last mentioned kind wherein the attaching bolts or cap screws are removable from the hub flange and the primary object of the invention is to provide an indeed simple and efficient means whereby such wheels may be quickly and easily mounted.

A further object of the invention is to provide such a means which may be easily produced at a low cost and will take up but a little room when stored in the tool box awaiting its use.

My invention consists generally in a device of such character that the above mentioned objects together with others as well as the many advantages thereof that will hereinafter appear are attainable; and my invention will be more readily understood by reference to the accompanying drawings which illustrate what I consider, at the present time, to be the preferred embodiment thereof.

In said drawings:

Fig. 1 is a perspective view of a part of an automobile illustrating my improved wheel mounting means in position on one of the hub flanges thereof, ready for use in the operation of mounting a wheel upon its associated hub.

Fig. 2 is a vertical section through a demountable wheel of the disc type, with which my improved means is especially adapted for use in the mounting of the same upon a hub.

Fig. 3 is a vertical section through the hub, back flange and brake drum of an automobile wheel with my improved means in position as when mounting a demountable wheel upon said hub.

Fig. 4 is a detail sectional view on an enlarged scale through parts of the structure shown in Fig. 3 and which will be more fully referred to later.

Referring now in detail to that embodiment of the invention illustrated in the accompanying drawings, 1 indicates as a whole a part of an automobile having demountable wheel equipment. 2 indicates one of the rear wheels demountable from and mountable upon the hub 3, the said wheel as herein shown being of the steel disc type. My invention will be described as used in mounting such a demountable disc wheel but this is to be considered as by way of illustration only and not by way of limitation because my improved mounting means is just as adaptable for use with wood and wire wheels as it is with a disc wheel.

In Fig. 3 is best shown a typical hub construction for a mountable at the hub, front or rear, wheel wherein the hub 3 includes a hub barrel 4 and back flange 5. In this instance the back flange is annularly recessed on its front face to provide a seat 6 for the front wall or disc 7 of a brake drum 8. The front wall of the brake drum and said back flange have a plurality of registering threaded openings 9 and 9ᵃ respectively, the one forming a continuation of the other. The holes 9—9ᵃ are so spaced as to register with holes 10 formed in the disc body 11 of the wheel 2 so that the usual attaching bolts (not shown) may be passed through said holes 10 to be threaded into the holes 9—9ᵃ to removably secure the wheel upon the hub. Usually in the case of disc wheels a filler disc 12 of non-metallic material is disposed between the wheel disc and back flange and in said disc are holes 13 in registration with the holes 9—9ᵃ and 10 respectively.

Considerable trouble has been met with in mounting a wheel of this type because it is indeed difficult to so position the wheel on the hub so that the various holes will register. In many instances the axial hub opening in the disc fitting the hub barrel snugly, will bind so that the paint on the hub barrel is marred and scratched thus detracting from the neat appearance intended to be given by a wheel of this kind.

To overcome these difficulties I have provided an indeed simple and efficient means for mounting such wheels. Said means consists of one or more pin like members or devices 14 adapted to be removably engaged at one end in desired back flange holes, which pins are of a length approximating that of the hub barrel. Each pin (see Fig. 4) comprises a rigid non-jointable headless body 14$^a$ of cylindrical cross section, having a smooth rounded outer end 14$^b$ and a threaded inner end 14$^c$, the terms "outer" and "inner" being used relatively only to indicate the ends thereof when the device is in use. The threaded end of these mounting pins will have a loose fit in the hub flange holes so that they may be screwed in by hand without the aid of tools of any kind. However, if desired, a transverse hole 15 may be provided in the outer end of the pin to receive a drift or the like should the pin be hard to release or screw into the hub flange holes in the first place.

In the use of the said pins during the mounting of a wheel assuming the axle has been jacked up as in Fig. 1, I prefer to employ the pins two at a time although a more or less number may be employed. When two of such pins are used, I thread them into diametrically opposite holes, arranged preferably in a vertical plane. When the pins are in place as shown in Figs. 1 and 3, the rounded ends 14$^b$ thereof project a short distance beyond the end of the hub barrel and substantially flush with the hub cap 16 thereon.

The wheel is now grasped in the usual manner with at least two of the holes 10—10 therein arranged in approximately a vertical plane, and is moved toward the hub. The pins being a substantial length are easily sighted over the top of the wheel so that the position thereof with respect to those of said holes in the wheel disc may be nicely gauged. Furthermore the holes 10 in the disc body are usually disposed in an outward embossment 10$^a$ which when engaged from the rear by said pins acts to direct the rounded outer end of the pin into and through the holes 10. Thus a support is afforded the wheel by said pins, after which the wheel is then pushed thereon in a guided path toward the back flange, the axial hole in the disc accurately registering with the hub barrel which is not scratched or marred in this operation.

The usual bolts are then inserted through those holes 10 not occupied by said pins and are thereafter entered and screwed up into the holes in the back flange. After these bolts have been placed in position the pins are withdrawn and the remaining bolts are then threaded into the holes formerly occupied by said pins when all the bolts are drawn up to securely fasten the wheel in place.

My improved device or means is indeed simple and efficient. The pins are made up from rods without waste and being a screw machine job may be readily turned out in great number at a very low cost.

While in describing my invention I have referred in detail to the construction thereof the same is to be considered as by way of illustration only so that I do not wish to be limited thereto except as may be pointed out in the appended claims.

I claim as my invention:

1. A device of the kind described comprising a rigid cylindrical body of a length greater than the axial depth of the body portion of the wheel to be mounted and approximating that of a wheel hub, one end of said body being exteriorly threaded and the other end of the said body being headless and devoid of sharp corners.

2. A device of the kind described comprising a rigid cylindrical body of a length greater than the axial depth of the body portion of the wheel to be mounted and approximating that of a wheel hub, one end of said body being exteriorly threaded and the other end being headless and rounded and having a transverse opening therethrough.

3. A device for horizontally assembling and supporting for mounting a wheel having bolt-accommodating apertures upon a revoluble hub flange having interiorly threaded bolt-attaching openings, said device comprising a rigid elongated member corresponding in shank diameter to the permanent bolts to be used and adapted for insertion within the wheel apertures, with one end exteriorly threaded to engage within the threaded bolt openings and the other end adapted to be rotatively engaged, said device having a length substantially greater than the aggregate axial depth of the bolt-attaching openings and apertured wheel body.

In testimony whereof, I have hereunto set my hand, this 3rd day of May, 1927.

ERLE K. BAKER.